United States Patent [19]
Takami et al.

[11] Patent Number: 4,532,179
[45] Date of Patent: Jul. 30, 1985

[54] METAL-CERAMIC BONDED MATERIAL

[75] Inventors: Akio Takami; Toshitaka Matsuura; Kazutoshi Tanaka; Toshifumi Sekiya, all of Aichi, Japan

[73] Assignee: NGK Spark Plug Co., Ltd., Japan

[21] Appl. No.: 483,302

[22] Filed: Apr. 8, 1983

[30] Foreign Application Priority Data

Apr. 10, 1982 [JP] Japan ................................. 57-60105

[51] Int. Cl.³ ............................................... B32B 9/00
[52] U.S. Cl. .................................... 428/335; 428/469; 428/433; 428/472; 428/701; 428/702
[58] Field of Search ............... 428/536, 469, 472, 699, 428/701, 702, 433, 215, 335, 216

[56] References Cited
U.S. PATENT DOCUMENTS 3,676,292  7/1972  Pryor et al. ........................... 428/433
4,109,054  8/1978  Burgyan ............................... 428/469

FOREIGN PATENT DOCUMENTS 77211  7/1978  Japan ................................... 428/472
156381  9/1982  Japan ................................... 428/469

Primary Examiner—George F. Lesmes
Assistant Examiner—E. Rollins Buffalow
Attorney, Agent, or Firm—Sughrue, Mion, Zinn, Macpeak, and Seas

[57] ABSTRACT

A metal-ceramic bonded material is described wherein a metal member comprising a metal film and an oxide film as an upper layer is bonded to a ceramic member by a heat-resistant adhesive so that the surface of the oxide film of said metal member faces the surface of the ceramic member.

14 Claims, 3 Drawing Figures

METAL-CERAMIC BONDED MATERIAL

FIELD OF THE INVENTION

The present invention relates to a bonded material composed of a metal member and a ceramic member, and, more particularly, to a bonded material composed of a metal member and a ceramic member, such as for use in an oxygen sensor, a spark plug, a temperature sensor, etc., which is especially useful for automotive applications in which it may be exposed to a heat cycle having a large temperature difference.

BACKGROUND OF THE INVENTION

Ceramics have been used as parts of machines which are exposed to high temperature because of their superior heat-resisting properties, and they are expected to be similarly applied in various fields in the future. However, in the case of, for example, an oxygen sensor utilizing a solid ceramic semiconductor, it is necessary to bond a ceramic member to an electrically conductive metal wire in a body as a combination, because the measurement of the oxygen requires the conductance of electricity. In such a bonded material wherein a ceramic member and a metal member are bonded in a body, a strain is caused between the ceramic member and the metal member when variations of temperatures are great under the circumstances of use, because of differing coefficients of thermal expansion (at a temperature of from room temperature to 300° C.), as shown in Table 1.

TABLE 1

| Metal | Coefficient of Thermal Expansion ($\alpha$) | Ceramic | Coefficient of Thermal Expansion ($\alpha$) |
|---|---|---|---|
| Iron | $134 \times 10^{-7}/°C.$ | Alumina | $70 \times 10^{-7}/°C.$ |
| Stainless SUS 304 | $178 \times 10^{-7}$ | Forsterite | $90 \times 10^{-7}$ |
| Stainless SUS 430 | $110 \times 10^{-7}$ | Steatite | $80 \times 10^{-7}$ |
| Nickel | $140 \times 10^{-7}$ | Beryllia | $75 \times 10^{-7}$ |
| 42 Ni—Fe | $67 \times 10^{-7}$ | | |
| Kovar | $51 \times 10^{-7}$ | | |

Furthermore, at a glance, it might be supposed that materials which have an approximately equal coefficients, for example, alumina and 42 Ni-Fe alloy described in Table 1, could be used as a combination without causing any problems. However, since 42 Ni-Fe alloy changes to have a high expansion coefficient at a temperature of more than 370° C., a severe thermal strain is caused under conventionally utilized temperatures of several hundred °C. Further, if such strain is repeatedly caused by a heat cycle, the ceramic member or the metal member may be broken, and, e.g., measurement using an oxygen sensor may become impossible.

In order to solve the above-described problem, it has been attempted to modify the adhesive property of a heat-resistant adhesive so as to relieve adhesion of the ceramic member and the metal member. However, such adhesives not only have a problem with respect to the strength of the bond, but also have a disadvantage in that the adhesion interface slides because of differences in the coefficient of thermal expansion to form a large crack(s) between the metal or ceramic member and the adhesive when the heat cycle is repeated, and the airtightness of the bond deteriorates by the invasion of alien substances into the crack.

SUMMARY OF THE INVENTION

As a result of extensive studies, it has now been found that the above-described problem can be overcome by interposing a substance which has both properties of a sealing function and sliding function on the interface between the material to be bonded and the adhesive, and thus the present invention has been completed.

That is, the present invention is directed to a metal-ceramic bonded material wherein a metal member comprising a metal film and an oxide film as an upper layer is bonded to a ceramic member with a heat-resistant adhesive so that the surface of the oxide film of said metal member faces the surface of the ceramic member.

In the figures, 1 is a metal member, 2 is a ceramic member, 3 is a metal film, 4 is an oxide film, 5 is a heat-resistant adhesive, 11 is a metal wire subjected to plating and oxidation (i.e., a metal member), 12 is an alumina ceramic ring (i.e., a ceramic member), and 13 is a heat resistant inorganic adhesive.

DETAILED DESCRIPTION OF THE INVENTION

The metal member for forming the bonded material has a base which is generally composed of a metal which is known for use together with ceramics for oxygen sensors, spark plugs, temperature sensors, etc. Examples of such base materials include Pt and iron, stainless SUS 304, stainless SUS 430, nickel, 42 Ni-Fe alloy, Kovar, etc., as described in Table 1 above. Materials for forming the metal film include metals for which the friction coefficient to adhesives becomes small, that is, a sliding function is provided, after oxidation thereof, examples of which include Pb, Mo, Co, Zn, Sn, Cu, W, Ni, etc. Among them, Cu and Ni are particularly suitable from the viewpoint of heat-resistance, oxidation resistance and sliding property.

As adhesives, it is possible to use heat-resistant inorganic adhesives which are conventionally used for bonding ceramics to metals. Examples thereof include phosphoric acid cement, water glass cement, etc.

Further, the ceramic member, which is the other material to be bonded, is composed of a ceramic generally used for oxygen sensors, spark plugs, temperature sensors, etc. Examples of such ceramic materials include alumina, forsterite, steatite, beryllia, etc., as described in Table 1.

Figure 1:
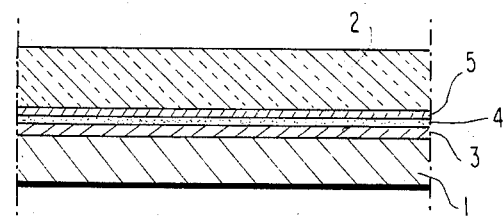
FIG. 1 is a partial section schematic view which illustrates a bonding state of a bonded material according to the present invention.

The bonded material composed of the above-described materials of the present invention is schematically represented as shown in FIG. 1. FIG. 1 shows a partial sectional view of a bonded material, wherein 1 is a metal member, 2 is a ceramic member, 3 is a metal film, 4 is an oxide film and 5 is a heat-resistant adhesive.

Formation of the above-described metal film on the above-described metal member as a base can generally be carried out by a plating method. For example, a metal film can be formed by an electroplating method in an aqueous solution containing 300 g/l of nickel chloride and 35 g/l of boric acid and having a pH of from 0.7 to 1.1 at a temperature of 50° C. The metal film initially deposited desirably has a thickness of from 2μ to 50μ.

In the present invention, if a heat-resistant adhesive is selected from those which do not prevent an oxygen supply to a metal film, an oxide film can be formed on the surface of metal film while the heat-resistant adhesive is hardened by utilizing a thermal treatment in air at from 200 to 500° C. in the bonding step of a metal member comprising the metal film and a ceramic member using the heat-resistant adhesive. The heat-resistant adhesive bonds the metal member with the ceramic member through the thus obtained oxide film. Since when the oxide film is made of an oxide by Cu or Ni the oxide film does not bond with the metal film very firmly, when a strain between the metal member and the ceramic member is caused by differences of the coefficient of thermal expansion thereof, the oxide film provides a sliding function due to its sideslip, and thereby destruction of metal member and ceramic member due to its stress is prevented. The oxide film may also be preliminarily formed by subjecting to a thermal treatment of the metal member comprising metal film in air, chemically oxidizing the same utilizing an oxidizing agent, etc., if the heat-resistant adhesive is selected from those which prevent the oxygen supply to the metal film. The oxide film desirably has a thickness of from 1μ to 50μ, and preferably has a thickness of from 5μ to 20μ. When the thickness of oxide film is less than 50μ, separation of the film does not occur and the oxide film can maintain excellent sliding and sealing effects, and in consequence an inferior product is not produced.

It is preferred that the thermal treatment is conducted to such temperature at which a metal-ceramic bonded material is exposed during operation.

In order to bond the metal member on which the metal film and the oxide film are formed as described above to the ceramic member in a body, it is possible to use conventional methods for bonding metal members to ceramic members. For example, a metal member can be fixed on a sintered ceramic member by means of an adhesive, and the adhered members are then subjected to thermal treatment.

In the bonded material of the present invention as described above, the oxide film formed on the metal film has a property of allowing an internal shear or a sideslip on the interface between the adhesive layer and the oxide film or the interface between the oxide film and the metal film by stresses which are lower than a destructive stress. Consequently, according to this invention, a strain caused by differences of the coefficients of thermal expansion between the metal member and the ceramic member which are bonded by means of the adhesive is absorbed so as to prevent destruction of the ceramic member and the metal member and the adhesive.

The present invention is illustrated below by reference to examples.

EXAMPLE 1

Figure 2:
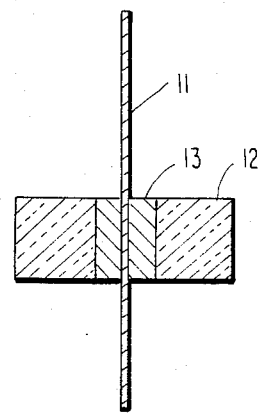
FIG. 2 is a sectional view of a test sample for carrying out a drawing test in an example according to the present invention.

As shown in FIG. 2, a metal wire 11 having a diameter of 0.45 mm was inserted into a center opening of an alumina ceramic ring 12 (outside diameter: 20 mm, inside diameter: 15 mm, and thickness: 5 mm), and a heat-resistant inorganic adhesive 13 (Sumicerum: S-208 type adhesive produced by Sumitomo Chemical Co., which is a mixture of aluminum phosphate solution as adhesive and aluminum oxide powder as reinforcing agent) was poured into the center opening of the above-described ring 12. After the metal wire 11 was fixed at the center, the adhesive 13 was hardened by carrying out a thermal treatment at 300° C. for 1 hour in air to obtain a bonded material.

Thereafter, the drawing strength of the metal wire 11 was measured by means of spring balance. Results are shown in Table 2.

TABLE 2

| No. | Metal Wire | Metal Film | Thickness of Metal Film (μ) | Drawing Strength (kg) |
| --- | --- | --- | --- | --- |
| 1 | Ni | None | None | 9.6 |
| 2* | " | Cu plating | 5 | 1.0 |
| 3* | " | Ni plating | 10 | 3.4 |
| 4 | Stainless SUS 430 | None | None | 10.0 |
| 5* | Stainless SUS 430 | Cu plating | 5 | 0.5 |
| 6 | Ni (or stainless) | None (but having an oxide film) | — | 7.1 |

*Material of the present invention

It is understood from the above-described results that the drawing strength is extremely reduced in case of forming the metal film on the metal wire. Accordingly, it is understood that a shear in the inner part of the oxide film or a sliding on the interface between the oxide film and the adhesive layer, or the interface between the oxide film and the metal film, easily occurs, thus protecting the bonded material from destruction.

EXAMPLE 2

Figure 3:
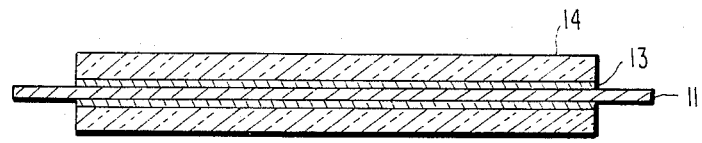
FIG. 3 is a sectional view of a test sample for carrying out a heat cycle test in an example of the present invention.

As shown in FIG. 3, a metal wire 11 having a diameter of 0.45 mm was inserted into the center opening of an alumina ceramic tube 4 (outside diameter: 8 mm, inside diameter: 1 mm, and length: 50 mm). After a heat-resistant adhesive 13 (the same as in Example 1) was poured into the center opening of the above-described tube 14, the adhesive was hardened by carrying out a thermal treatment at 300° C. for 1 hour in air to obtain a bonded material.

Thereafter, the center part of the bonded material was repeatedly subjected to red-heat treatment by a Bunsen burner and quick cooling treatment by compressed air over intervals of 5 minutes to repeat a heat cycle from 900° C. to 200° C., and a limit of the breaking of the wire was measured by checking the conductive property of the wire every 100 cycles. The results are shown in Table 3 below. As is obvious from the results, abnormality of the conductive property was not observed in bonded materials Nos. 2, 3 and 5 after 2,000 cycles, while the breaking of the wire was caused in bonded materials Nos. 1, 4 and 6 after 200 cycles, 700 cycles and 1,000 cycles, respectively, and the function of electrode became failed.

TABLE 3

| No. | Metal Wire | Metal Film | Thickness of Metal Film (μ) | Limit of Breaking of Wire |
| --- | --- | --- | --- | --- |
| 1 | Ni | None | None | Up to 200 cycles |
| 2* | Ni | Cu plating | 5 | No breaking after 2,000 cycles |
| 3* | Ni | Ni plating | 10 | No breaking after 2,000 cycles |

TABLE 3-continued

| No. | Metal Wire | Metal Film | Thickness of Metal Film (μ) | Limit of Breaking of Wire |
|---|---|---|---|---|
| 4 | Stainless SUS 430 | None | None | Up to 700 cycles |
| 5* | Stainless SUS 430 | Cu plating | 5 | No breaking after 2,000 cycles |
| 6 | Ni (or stainless) | None (but having an oxide film) | — | Up to 1,000 cycles |

*Material of the present invention

Further, when an airtightness test was carried out by applying compressed air at 10 atms. to an end of the tube in Example 2 after carrying out the above-described cycle test and measuring the quantity of the air leaking out from the other end, the bonded materials Nos. 1 to 6 had sufficient airtightness that less than 0.5 cc/minute passed. Accordingly, it was understood that the sliding face was sealed in the bonded materials Nos. 2, 3 and 5 notwithstanding carrying out 2,000 cycles.

While the invention has been described in detail and with reference to specific embodiments thereof, it will be apparent to one skilled in the art that various changes and modifications can be made therein without departing from the spirit and scope thereof.

What is claimed is:

1. A metal-ceramic bonded material, wherein a metal member consisting essentially of a base material, a metal film and an oxide film of a thickness less than about 50μ as an upper layer is bonded to a ceramic member by a heat-resistant inorganic adhesive so that the surface of the oxide film of said metal member faces the surface of the ceramic member and the oxide film acts to provide a sliding function between the metal film and the heat-resistant adhesive.

2. A metal-ceramic bonded material according to claim 1, wherein the oxide film is formed by utilizing a thermal treatment in air at from 200 to 500° C. in a bonding step using a heat-resistant adhesive for adhering the ceramic member to the metal member.

3. A metal-ceramic bonded material according to claim 1, wherein the oxide film is formed by subjecting to a thermal treatment of the metal member comprising metal film in air, or chemically oxidizing the same by oxidizing agent prior to a bonding step.

4. A metal-ceramic bonded material according to claim 1, wherein the heat-resistant adhesive is selected from a group consisting of phosphoric acid cement and water glass cement.

5. A metal-ceramic bonded material according to claim 1, wherein the heat-resistant adhesive is a mixture of aluminum phosphate solution as an adhesive and aluminum oxide powder as a reinforcing agent.

6. A metal-ceramic bonded material according to claim 1, wherein the oxide film has a thickness of from 1μ to 50μ.

7. A metal-ceramic bonded material according to claim 6, wherein the oxide film is formed by utilizing a thermal treatment in air at from 200 to 500° C. in a bonding step using a heat-resistant adhesive for adhering the ceramic member to the metal member.

8. A metal-ceramic bonded material according to claim 6, wherein the oxide film is formed by subjecting to a thermal treatment of the metal member comprising metal film in air or chemically oxidizing the same by oxidizing agent prior to a bonding step.

9. A metal-ceramic bonded material according to claim 1, wherein the metal film is composed of copper or nickel.

10. A metal-ceramic bonded material according to claim 9, wherein the oxide film is formed by utilizing a thermal treatment in air at from 200 to 500° C. in a bonding step using a heat-resistant adhesive for adhering the ceramic member to the metal member.

11. A metal-ceramic bonded material according to claim 9, wherein the oxide film is formed by subjecting to a thermal treatment of the metal member comprising metal film in air or chemically oxidizing the same by oxidizing agent prior to a bonding step.

12. A metal-ceramic bonded material according to claim 9, wherein the oxide film has a thickness of from 1μ to 50μ.

13. A metal-ceramic bonded material according to claim 12, wherein the oxide film is formed by utilizing a thermal treatment in air at from 200 to 500° C. in a bonding step using a heat-resistant adhesive for adhering the ceramic member to the metal member.

14. A metal-ceramic bonded material according to claim 12, wherein the oxide film is formed by subjecting to a thermal treatment of the metal member comprising metal film in air or chemically oxidizing the same by oxidizing agent prior to a bonding step.

* * * * *